US008610756B2

(12) United States Patent
Lee

(10) Patent No.: US 8,610,756 B2
(45) Date of Patent: Dec. 17, 2013

(54) METHOD, SYSTEM AND MOBILE DEVICE FOR CALL SWITCHING SERVICE

(75) Inventor: Saeng Hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 13/014,024

(22) Filed: Jan. 26, 2011

(65) Prior Publication Data

US 2011/0181681 A1    Jul. 28, 2011

(30) Foreign Application Priority Data

Jan. 28, 2010  (KR) .................. 10-2010-0007670

(51) Int. Cl.
*H04N 7/14*   (2006.01)
(52) U.S. Cl.
CPC ...................................... *H04N 7/14* (2013.01)
USPC ................... 348/14.02; 348/14.01; 455/414.1
(58) Field of Classification Search
USPC ............ 348/14.01–14.16; 455/466, 403, 419, 455/414.1, 445, 567; 370/260–261; 709/204–205
See application file for complete search history.

(56) References Cited

U.S. PATENT DOCUMENTS

| 7,321,748 | B2  |   | 1/2008  | Tokoro |          |
|-----------|-----|---|---------|--------|----------|
| 7,433,699 | B2  | * | 10/2008 | Kohno et al. | 455/466 |
| 8,294,747 | B1  | * | 10/2012 | Weinberg et al. | 348/14.02 |
| 2004/0239754 | A1 | * | 12/2004 | Shachar et al. | 348/14.08 |
| 2005/0122963 | A1 |   | 6/2005  | Jeon et al. | |
| 2010/0165966 | A1 | * | 7/2010  | Petion et al. | 370/338 |

* cited by examiner

*Primary Examiner* — Melur Ramakrishnaiah
(74) *Attorney, Agent, or Firm* — Jefferson IP Law, LLP

(57) ABSTRACT

A method, system and device for call switching between a mobile device using a mobile communication network and any data communication equipment using other type of communication network without any disconnection of a on ongoing call is provided. In a method for a call switching service, the first and second mobile devices establish wireless communication channels with the mobile communication network, respectively. The first mobile device transfers a call to specific data communication equipment. The mobile communication network establishes a call channel between the specific data communication equipment to which the call is transferred and the second mobile device that is not transferring the call to the specific data communication equipment.

18 Claims, 7 Drawing Sheets

METHOD, SYSTEM AND MOBILE DEVICE FOR CALL SWITCHING SERVICE

PRIORITY

This application claims the benefit under 35 U.S.C. §119(a) of a Korean patent application filed on Jan. 28, 2010 in the Korean Intellectual Property Office and assigned Serial No. 10-2010-0007670, the entire disclosure of which is hereby incorporated by reference.

BACKGROUND OF THE INVENTION

1. Field of the Invention

The present invention relates to a call switching service. More particularly, the present invention relates to a method, system and mobile device for performing a call switching service without any disconnection of an ongoing call.

2. Description of the Related Art

With the advancements in electrical technologies, mobile devices are becoming increasingly popular. Typically, a mobile device not only provides a voice call service using a mobile communication network, but also offer one or more of a video call service, a data transmission service, and any other various additional services, thus evolving into a multimedia communication device.

Meanwhile, there have been recent efforts to enable various electronic devices, other than traditional communication equipment, to operate as data communication equipment by assigning a specific address structure, e.g., an Internet Protocol (IP) address, to them. Therefore, based on the specific address structure, such electronic devices come to offer a voice call service, a video call service, and various data transmission services through a communication network.

However, if a user who uses a voice or video call service through a mobile device desires to use it continuously through data communication equipment, the user may suffer inconvenience by having to stop a current call and then reconnect for a new call using data communication equipment. Accordingly, there is a need for a new approach to call switching between a mobile device and data communication equipment.

SUMMARY OF THE INVENTION

An aspect of the present invention is to address at least the above-mentioned problems and/or disadvantages and to provide at least the advantages described below. Accordingly, an aspect of the present invention is to provide a method, system and mobile device for performing a call switching service in which a call switching is allowed between the mobile device using a mobile communication network and any data communication equipment using another type of communication network, without any disconnection of a call.

In accordance with an aspect of the present invention, a method for a call switching service of a mobile device is provided. The method includes at a first mobile device, transferring a call to specific data communication equipment, the first mobile device establishing a wireless communication channel with a mobile communication network, and at the mobile communication network, establishing a call channel between the specific data communication equipment to which the call is transferred and a second mobile device that is not transferring the call to the specific data communication equipment, the second mobile device establishing a wireless communication channel with the mobile communication network.

In accordance with another aspect of the present invention, a system for a call switching service of a mobile device is provided. The system includes first and second mobile devices each for performing a voice or video call function through a mobile communication network and each including short range wireless communication unit. first and second data communication equipments each for performing a voice or video call function through a communication network and each including a short range wireless communication unit. the mobile communication network for establishing a wireless communication channel with each of the first and second mobile devices in order to support a voice or video call and, when receiving a request for a call switching to at least one of the first and second data communication equipments from at least one of the first and second mobile devices, for performing a call switching procedure. and the communication network connected to the first and second data communication equipments and the mobile communication network for supporting a data communication based on a data packet exchange.

In accordance with still another aspect of the present invention, a mobile device is provided. The device includes a Radio Frequency (RF) unit for establishing a wireless communication channel with a mobile communication network and for transmitting and receiving data through the wireless communication channel, a short range wireless communication unit for establishing a short range wireless communication channel with neighboring data communication equipment and for transmitting and receiving data through the short range wireless communication channel, and a control unit for controlling the RF unit to transmit and receive call data for a voice or video call, for controlling signals for a call switching service, and for controlling the short range wires communication unit to acquire at least one of an Internet Protocol (IP) address, a domain name and a Media Access Control (MAC) address of data communication equipment to which a call is transferred.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
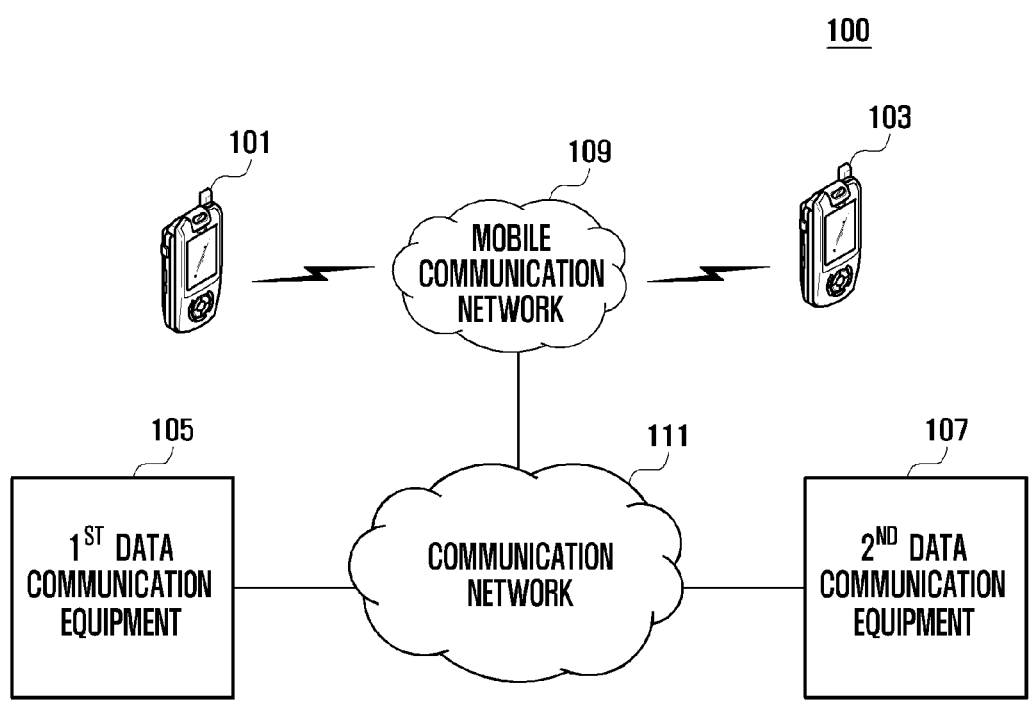
FIG. 1 is a schematic view illustrating a system for a call switching service of a mobile device according to an exemplary embodiment of the present invention.

FIG. 1 is a schematic view illustrating a system for a call switching service of a mobile device according to an exemplary embodiment of the present invention.

Referring to FIG. 1, the call switching service system 100 may include the first mobile device 101, the second mobile device 103, the first data communication equipment 105, the second data communication equipment 107, a mobile communication network 109, and another type of communication network 111.

The call switching service system 100 can switch a voice or video call between the first and second mobile devices 101 and 103 to a call between the first data communication equipment 105, to which the first mobile device 101 transfers a call, and the second mobile device 103, and also can switch a voice or video call between the first data communication equipment 105 and the second mobile device 103 to a call between the first and second mobile devices 101 and 103, depending on user's manipulation. Similarly, the call switching service system 100 can switch a voice or video call between the first and second mobile devices 101 and 103 to a call between the first mobile device 101 and the second data communication equipment 107 to which the second mobile device 103 transfers a call, and also can switch a voice or video call between the first mobile device 101 and the second data communication equipment 107 to a call between the first and second mobile devices 101 and 103, depending on user's manipulation. Namely, the call switching service system 100 can offer a call switching service between the first mobile device 101 and the first data communication equipment 105 and a call switching service between the second mobile device 103 and the second data communication equipment 107.

More particularly, the call switching service system 100 may offer the above-mentioned call switching service without any disconnection of the ongoing call while switching a call. Meanwhile, the first mobile device 101 may transfer a call to the first data communication equipment 105, and also the second mobile device 103 may transfer a call to the second data communication equipment 107, thus performing a call between the first and second data communication equipments 105 and 107. In this case, the call switching service system 100 may enable the first and second data communication equipments 105 and 107 to send and receive call data through the communication network 111.

Now, respective elements and functions of the call switching service system 100 are described in more detail below.

The first and second mobile devices 101 and 103 can perform a voice call function, a video call function, a message service function, and various data transmission and reception functions through the mobile communication network 109. Each of the first and second mobile devices 101 and 103 can perform a communication with any communication equipments that access the mobile communication network 109 through their communication network, and also can perform directly a short range wireless communication with such communication equipments through a short range wireless communication module using a Bluetooth, infrared, or other communication technique. Through a short range wireless communication, the first mobile device 101 can acquire an Internet Protocol (IP) address or domain name of the first data communication equipment 105, and the second mobile device 103 can acquire an IP address or domain name of the second data communication equipment 107. When acquiring a domain name, the first and second mobile devices 101 and 103 can acquire an IP address corresponding to a domain name through a Domain Name Server (DNS). If the communication network 111 is formed of Ethernet, the first and second mobile devices 101 and 103 can acquire a Media Access Control (MAC) address instead of an IP address or domain name. Meanwhile, the first and second mobile devices 101 and 103 can transmit a call switching request message containing an IP address acquired through a short range wireless communication, to the mobile communication network 109. If the communication network 111 is formed of Ethernet, the first and second mobile devices 101 and 103 can transmit a call switching request message containing a MAC address acquired through a short range wireless communication, to the mobile communication network 109. Thereafter, when receiving a call switching acknowledge message from the mobile communication network 109, the first and second mobile devices 101 and 103 can terminate a current call.

The first and second data communication equipments 105 and 107 can perform a voice call function, a video call function, and data transmission and reception functions through their communication network 111. Each of the first and second data communication equipments 105 and 107 can perform a communication function by transmitting and receiving data packets to and from the communication network 111, and also can perform directly a short range wireless communication with other communication equipments through a short range wireless communication module using a Bluetooth, infrared, or other communication technique. Through a short range wireless communication, the first data communication equipment 105 can acquire a phone number of the first mobile device 101, and the second data communication equipment 107 can acquire a phone number of the second mobile device 103. Additionally, the first and second data communication equipments 105 and 107 can transmit a call switching request message containing a phone number acquired through a short range wireless communication, to the mobile communication network 109 through their communication network 111. When receiving a call switching acknowledge message from the mobile communication network 109, the first and second data communication equipments 105 and 107 can terminate a current call.

The mobile communication network 109 enables the first and second mobile devices 101 and 103 to perform a mobile communication with each other by establishing a wireless communication channel with the first and second mobile devices 101 and 103. Additionally, the mobile communication network 109 can be connected to the communication network 111. Therefore, the mobile communication network 109 can enable the first mobile device 101 to perform a data communication with the second data communication equipment 107 that accesses the communication network 111, and also can enable the second mobile device 103 to perform a data communication with the first data communication equipment 105 that accesses the communication network 111.

More particularly, the mobile communication network 109 can support a call switching service function according to an exemplary embodiment of the present invention. For this, when receiving a call switching request message from one of the first and second mobile devices 101 and 103, the mobile communication network 109 can switch a call path of that mobile device to an IP address or MAC address contained in the received call switching request message. For instance, while the first and second mobile devices 101 and 103 perform a voice or video call through the mobile communication network 109, the second mobile device 103 may send a call switching request message containing an IP address or MAC address of the second data communication equipment 107 to the mobile communication network 109. Then the mobile communication network 109 sends an inquiry message for checking a receive-ready state of the second data communication equipment 107 to the second data communication equipment 107 through the communication network 111. When receiving a response message indicating that the second data communication equipment 107 is ready to receive, the mobile communication network 109 transmits call data of the first mobile device 101 to the second data communication equipment 107 and also transmits call data of the second data communication equipment 107 to the first mobile device 101 through the communication network 111. Additionally, the mobile communication network 109 sends a call switching acknowledge message to the second mobile device 103 so that the second mobile device 103 may terminate a current call.

Figure 2:
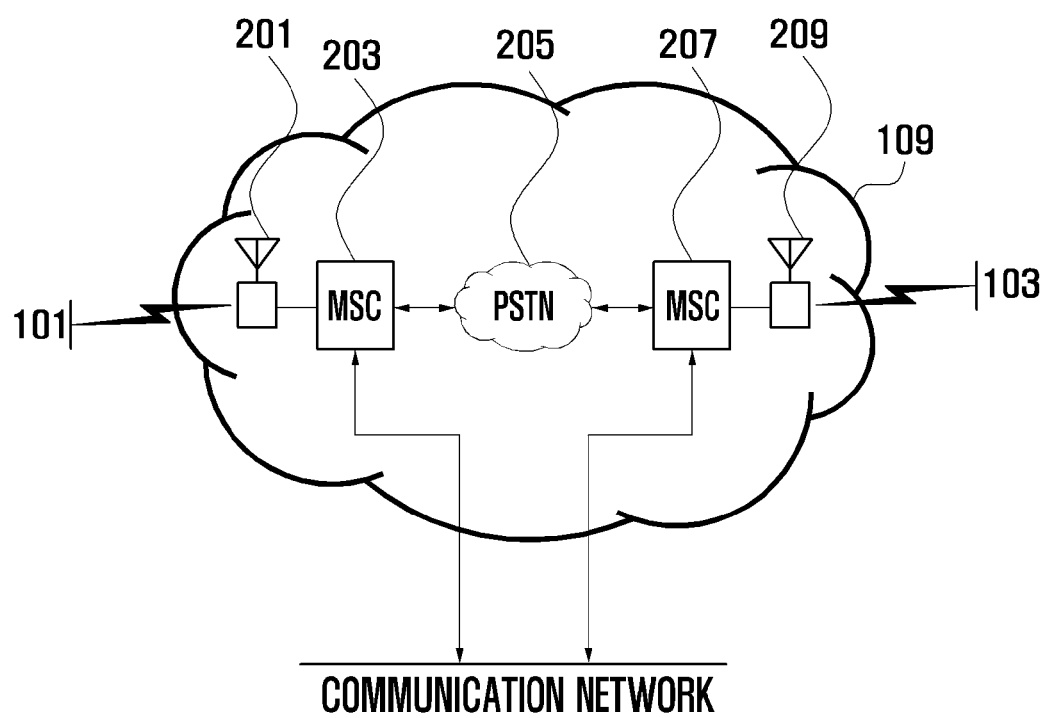
FIG. 2 is a schematic view illustrating the structure of a mobile communication network according to an exemplary embodiment of the present invention.

FIG. 2 is a schematic view illustrating the structure of a mobile communication network according to an exemplary embodiment of the present invention.

Referring to FIG. 2, the mobile communication network 109 may include a first base station 201, a second base station 209, a first Mobile Switching Center (MSC) 203, a second MSC 207, and a Public Switched Telephone Network (PSTN) 205.

The first base station 201 establishes a wireless communication channel with the first mobile device 101 and then supports a call data exchange between the first mobile device 101 and the first MSC 203. Similarly, the second base station 209 establishes a wireless communication channel with the second mobile device 103 and then supports a call data exchange between the second mobile device 103 and the second MSC 207.

The first MSC 203 is connected to the first base station 201, thereby controlling a voice or video call service and any other of various additional services of the first mobile device 101, establishing a call path of the first mobile device 101, and offering a connection between the first mobile device 101 and any other equipment or external network. Similarly, the second MSC 207 is connected to the second base station 209, thereby controlling a voice or video call service and any other various additional services of the second mobile device 103, establishing a call path of the second mobile device 103, and offering a connection between the second mobile device 103 and any other equipment or external network. The PSTN 205 connects the first and second MSCs 203 and 207, thereby supporting various data exchanges between them.

Meanwhile, the communication network 111 secures a data communication channel between the mobile communication network 109 and each of the first and second data communication equipments 105 and 107, thereby supporting transmission and reception of various kinds of information. For instance, in a case where the mobile communication network 109 sends a data packet indicating an IP address of the second data communication equipment 107 to the communication network 111, the communication network 111 may deliver the received data packet to the second data communication equipment 107. Similarly, in a case where the second data communication equipment 107 sends a data packet indicating an IP address of the mobile communication network 109 to the communication network 111, the communication network 111 may deliver the received data packet to the mobile communication network 109. That is, the communication network 111 may support a communication between any communication equipments connected to the communication network 111 through a communication channel.

The communication network 111 may be formed of Ethernet. In this case, the communication network 111 may use a MAC address instead of an IP address in order to identify each of the first and second data communication equipments 105 and 107. For instance, if the mobile communication network 109 sends a data packet indicating a MAC address of the second data communication equipment 107 to the communication network 111, the communication network 111 may deliver the received data packet to the second data communication equipment 107. Similarly, if the second data communication equipment 107 sends a data packet indicating a MAC address of the mobile communication network 109 to the communication network 111, the communication network 111 may deliver the received data packet to the mobile communication network 109.

Figure 3:
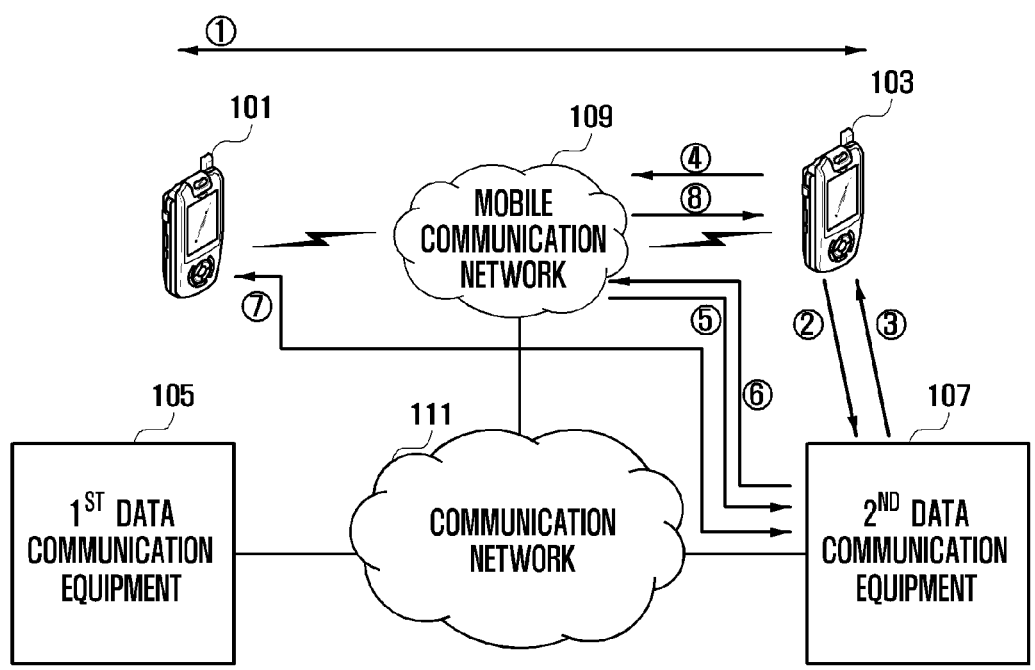
FIGS. 3 and 4 are schematic views respectively illustrating a procedure of a call switching service in a call switching service system according to an exemplary embodiment of the present invention.
Figure 4:
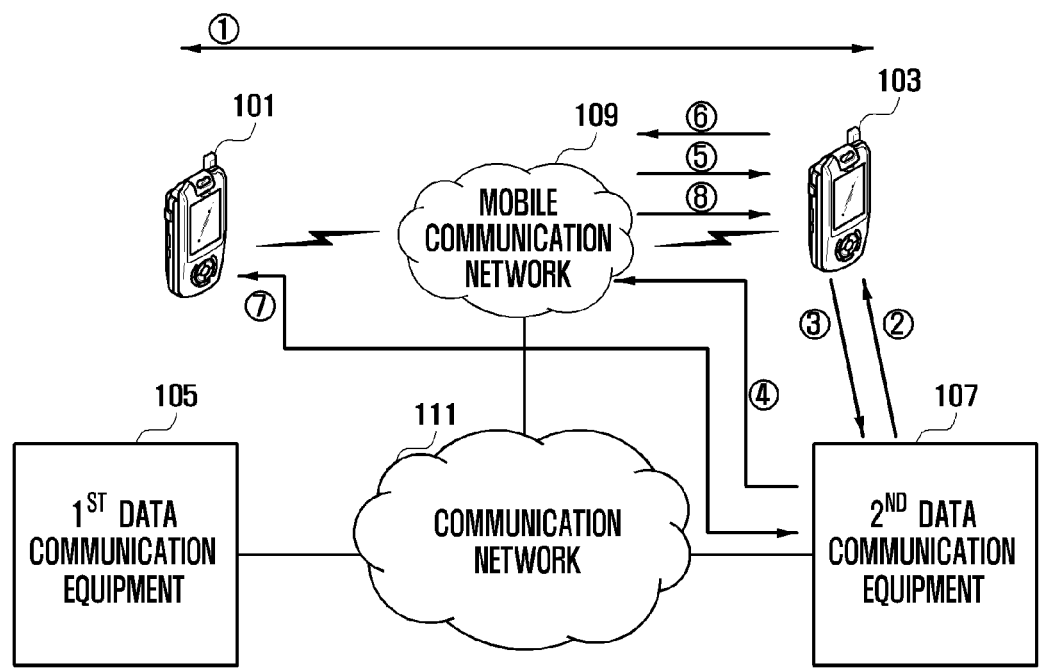

FIGS. 3 and 4 are schematic views respectively illustrating a procedure of a call switching in a call switching service system according to an exemplary embodiment of the present invention.

More particularly, FIG. 3 shows a procedure in which the second mobile device 103 that transmits a call performs a call switching after acquiring an address of the second data communication equipment 107 that will receive a call.

Referring to FIG. 3, the first and second mobile devices 101 and 103 perform a voice or video call by transmitting and receiving call data through the mobile communication network 109 in step ①. Then, depending on a user's manipulation, the second mobile device 103 may send a message for requesting an IP address or domain name to the second data communication equipment 107 through a short range wireless communication module in step ②. If the communication network 111 is formed of Ethernet, the second mobile device 103 may send a message for requesting a MAC address of the second data communication equipment 107. In this step, a user's manipulation may be an act of making the second mobile device 103 approach the second data communication equipment 107 so as to be within a certain proximity of the second data communication equipment 107 or an act of selecting the second data communication equipment 107 among neighboring data communication equipments that are found using a suitable manner such as Bluetooth or another technique.

After receiving a message for requesting an IP address or domain name or a message for requesting a MAC address, the second data communication equipment 107 may send one of an IP address, a domain name and a MAC address of the second data communication equipment 107 to the second mobile device 103 through a short range wireless communication module in step ③. If the second data communication equipment 107 sends a domain name to the second mobile device 103, the second mobile device 103 can acquire an IP address corresponding to a domain name through a DNS. Therefore, the second mobile device 103 can acquire an IP address or MAC address of the second data communication equipment 107. In addition, the second mobile device 103 can acquire an address of the second data communication equipment 107 by receiving one of an IP address, a domain name and a MAC address directly inputted from a user or by receiving a user's selection of one of IP addresses, domain names and MAC addresses stored in advance.

After acquiring an address of the second data communication equipment 107, the second mobile device 103 sends a call switching request message to the mobile communication network 109 in step ④. This call switching request message may contain information about the second mobile device 103 and one of an IP address, a domain name and a MAC address of the second data communication equipment 107. After receiving a call switching request message, the mobile communication network 109 sends an inquiry message for checking a call-ready state of the second data communication equipment 107 to the second data communication equipment 107 through the communication network 111 in step ⑤. Then the second data communication equipment 107 checks a call-ready state and sends a response message, indicating that the second data communication equipment 107 is ready to perform a call through the communication network, to the mobile communication network 109 in step ⑥. This step may include step of receiving a user's input of accepting a call switching.

When receiving a response message indicating that the second data communication equipment 107 is ready for a call, the mobile communication network 109 transmits call data, received from the first mobile device 101, to the second data communication equipment 107 through the communication network 111 in step ⑦. Also, the mobile communication network 109 transmits call data, received from the second data communication equipment 107 through the communication network 111, to the first mobile device 101 in step ⑦. Namely, the mobile communication network 109 switches a voice or video call between the first and second mobile devices 101 and 103 to a call between the first mobile device 101 and the second data communication equipment 107. Here, the mobile communication network 109 may perform step ⑦ through the first MSC 203 or the second MSC 207. That is, a path of exchanging call data after a call switching through step ⑦ may include two cases. The first call path from the first mobile device 101 to the second data communication equipment 107 is defined as passing through the first base station 201, the first MSC 203 and the communication network 111. Also, the second call path from the first mobile device 101 to the second data communication equipment 107 is defined as passing through the first base station 201, the first MSC 203, the PSTN 205, the second MSC 207 and the communication network 111. A selection of call paths may be made by a designer or operator of the mobile communication network 109. Alternatively, a call path may be selected to pass through an MSC having a relatively smaller call load. Namely, in step ⑦, if the first MSC 203 has a greater call load than the second MSC 207, the mobile communication network 109 may select the second call path. Otherwise, if second MSC 207 has a greater call load than the first MSC 203, the mobile communication network 109 may select the first call path.

Thereafter, the mobile communication network 109 sends a message for indicating the completion of a call switching to the second mobile device 103 so that the second mobile device 103 may terminate a current call in step ⑧.

Meanwhile, the above-discussed call switching procedure may be performed between the first mobile device 101 and the first data communication equipment 105. Additionally, if the first and second data communication equipments 105 and 107 perform a voice or video call with each other after a call switching procedure, call data may be exchanged through only the communication network 111 without passing through the mobile communication network 109.

FIG. 4 shows a procedure in which the second data communication equipment 107 that will receive a call performs a call switching after acquiring a phone number of the second mobile device 103 that transmits a call according to an exemplary embodiment of the present invention.

Referring to FIG. 4, the first and second mobile devices 101 and 103 perform a voice or video call by transmitting and receiving call data through the mobile communication network 109 in step ①. Then, depending on a user's manipulation, the second data communication equipment 107 may send a message for requesting a phone number to the second mobile device 103 through a short range wireless communication module in step ②. In this step, a user's manipulation may be an act of making the second mobile device 103 approach the second data communication equipment 107 or an act of selecting the second mobile device 103 among neighboring mobile devices that are found using a suitable manner such as Bluetooth.

After receiving a message for requesting a phone number, the second mobile device 103 may send a phone number of the second mobile device 103 to the second data communication equipment 107 through a short range wireless communication module in step ③. Therefore, the second data communication equipment 107 can acquire a phone number of the second mobile device 103. In addition, the second data communication equipment 107 can acquire a phone number of the second mobile device 103 by receiving a phone number directly inputted from a user or by receiving a user's selection of one of phone numbers stored in advance.

After acquiring a phone number of the second mobile device 103, the second data communication equipment 107 sends a call switching request message to the mobile communication network 109 in step ④. This call switching request message may contain information about the second data communication equipment 107 and a phone number of the second mobile device 103. After receiving a call switching request message, the mobile communication network 109 sends an inquiry message for checking a call-ready state of the second mobile device 103 to the second mobile device 103 in step ⑤. Then the second mobile device 103 checks a call-ready state and sends a response message, indicating that the second mobile device 103 is ready to perform a call, to the mobile communication network 109 in step ⑥. This step may include a step of receiving user's input of accepting a call switching.

When receiving a response message indicating that the second mobile device 103 is ready for a call, the mobile communication network 109 transmits call data, received from the first mobile device 101, to the second data communication equipment 107 through the communication network 111 in step ⑦. Also, the mobile communication network 109 transmits call data, received from the second data communication equipment 107 through the communication network 111, to the first mobile device 101 in step ⑦. Namely, the mobile communication network 109 switches a voice or video call between the first and second mobile devices 101 and 103 to a call between the first mobile device 101 and the second data communication equipment 107. Here, the mobile communication network 109 may perform step ⑦ through the first MSC 203 or the second MSC 207. That is, a path of exchanging call data after a call switching through step ⑦ may include two cases. The first call path from the first mobile device 101 to the second data communication equipment 107 is defined as passing through the first base station 201, the first MSC 203 and the communication network 111. Also, the second call path from the first mobile device 101 to the second data communication equipment 107 is defined as passing through the first base station 201, the first MSC 203, the PSTN 205, the second MSC 207 and the communication network 111. A selection of call paths may be made by a designer or operator of the mobile communication network 109. Alternatively, a call path may be selected to pass through an MSC having a relatively smaller call load. Namely, in step ⑦, if the first MSC 203 has a greater call load than the second MSC 207, the mobile communication network 109 may select the second call path. Otherwise, if the second MSC 207 has a greater call load than the first MSC 203, the mobile communication network 109 may select the first call path.

Thereafter, the mobile communication network 109 sends a message for indicating the completion of a call switching to the second mobile device 103 so that the second mobile device 103 may terminate a current call in step ⑧.

Meanwhile, the above-discussed call switching procedure may be performed between the first mobile device 101 and the first data communication equipment 105. Additionally, if the first and second data communication equipments 105 and 107 perform a voice or video call with each other after a call switching procedure, call data may be exchanged through only the communication network 111 without passing through the mobile communication network 109.

Now, the configuration of the first and second mobile devices 101 and 103 is described in more detail below. In exemplary embodiments of the present invention, the first and second mobile devices 101 and 103 may have the same configuration and functions. Therefore, the following description will use a term 'a specific mobile device', which may be more concisely referred to as 'a mobile device', in order to commonly indicate one of the first and second mobile devices 101 and 103. However, if necessary, the first and second mobile devices 101 and 103 may be individually described. Similarly, a term 'specific data communication equipment', which may be more concisely referred to as 'data communication equipment' will be used to commonly indicate one of the first and second data communication equipments 105 and 107. However, if necessary, the first and second data communication equipments 105 and 107 may be individually described.

Figure 5:
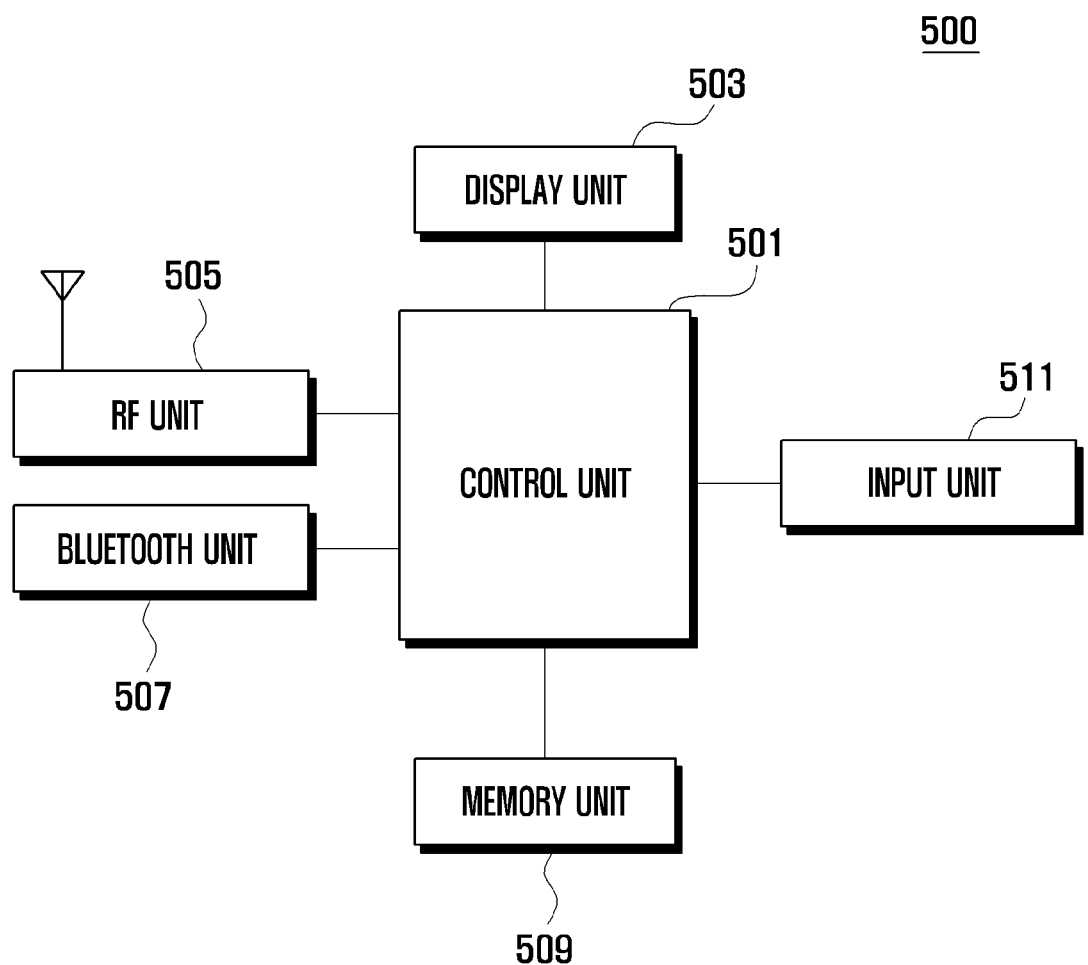
FIG. 5 is a block diagram illustrating the configuration of a mobile device according to an exemplary embodiment of the present invention.

FIG. 5 is a block diagram illustrating the configuration of a mobile device according to an exemplary embodiment of the present invention.

In an exemplary embodiment of the present invention, which is described below, a specific mobile device 500 has a Bluetooth unit 507 as a means of performing a short range wireless communication with other communication equipments. However, the Bluetooth unit 507 is only illustrated in FIG. 5 and described herein as an example and is not to be considered as a limitation of the present invention. In other exemplary embodiments, the specific mobile device 500 may have at least one of the Bluetooth unit, a Zigbee unit, a Near Field Communication (NFC) unit, an infrared communication unit, and their application units, as a means of a short range wireless communication.

Referring to FIG. 5, the specific mobile device 500 according to this exemplary embodiment includes a display unit 503, a Radio Frequency (RF) unit 505, a Bluetooth unit 507, a memory unit 509, an input unit 511, and a control unit 501.

The mobile device 500 having the above elements establishes a wireless channel with the mobile communication network 109 through the RF unit 505 and then, through the wireless channel, performs a voice or video call with other communication equipments that access the mobile communication network 109. Additionally, depending on a user's manipulation, the mobile device 500 performs a short range wireless communication directly with other communication equipments through the Bluetooth unit 507. Based on the above-discussed communication function, the mobile device 500 performs a call switching procedure of an exemplary embodiment of the present invention. Now, respective elements are described in more detail below.

The display unit 503 displays a variety of information inputted by a user or conveyed to a user, including various screens activated by execution of functions of the mobile device 500. For instance, the display unit 503 may visually output a boot screen, an idle screen, a call screen, and other application execution screens. Namely, the display unit 503 may offer various screen views related to states and operations of the mobile device 500. The display unit 503 may be formed of a Liquid Crystal Display (LCD), an Organic Light Emitting Diode (OLED), or any other equivalent.

More particularly, the display unit 503 may display information obtained while a call switching procedure of the mobile device 500 is performed. Namely, the display unit 503 may display information about the second data communication equipment 107 acquired by the second mobile device 103 during a call switching procedure. This information may contain one of an IP address, a domain name or a MAC address of the second data communication equipment 107. If the second mobile device 103 receives an IP address, a domain name or a MAC address of the second data communication equipment 107 directly inputted from a user, the display unit 503 may output a suitable input window for receiving a user's input. This is the same as in the first mobile device 101.

The RF unit 505 supports a communication function of the mobile device 500. More specifically, the RF unit 505 establishes a predefined communication channel with the mobile communication network 109 under the control of the control unit 501. Then the RF unit 505 transmits and receives a signal related to a wireless communication (e.g., a voice communication, a video communication) and a data communication (including a Short Message Service (SMS) and a Multimedia Message Service (MMS)). Additionally, the RF unit 505 not only converts voice/sound data, control data, etc. into a signal to be transmitted, but also converts a received signal into voice/sound data, control data, etc. For this, the RF unit 505 may include an RF transmitter that up-converts the frequency of a signal to be transmitted and amplifies the signal, and an RF receiver that amplifies a received signal with low-noise and down-converts the frequency of the signal.

More particularly, the RF unit 505 may transmit a call switching request message for a call switching procedure of the mobile device 500 to the mobile communication network 109. In addition, the RF unit 505 receives an inquiry message for checking a call-ready state from the mobile communication network 109 and also sends a response message indicating that it is ready to perform a call to the mobile communication network 109. Namely, when the second mobile device 103 acquires an address of the second data communication equipment 107 and then requests a call switching to the mobile communication network 109 in the above-discussed call switching procedure, the RF unit 505 may send a call switching request message to the mobile communication network 109. Also, when the second communication equipment 107 acquires a phone number of the second mobile device 103 and then requests a call switching to the mobile communication network 109 in the above-discussed call switching procedure, the RF unit 505 may receive a call switching acknowledge message from the mobile communication network 109 and then send a message indicating that it is ready for a call to the mobile communication network 109. This is the same as in the first mobile device 101.

The Bluetooth unit 507 establishes a wireless communication channel with the Bluetooth unit of another communication equipment and then supports a short range wireless communication to be performed directly with the other communication equipment. More particularly, the Bluetooth unit 507 may send and receive one of an IP address, a domain name and a MAC address, or a phone number, which is required for a call switching procedure. That is, when the second mobile device 103 acquires one of an IP address, a domain name and a MAC address of the second data communication equipment 107 and then sends a request for a call switching to the mobile communication network 109 in the above-discussed call switching procedure, the Bluetooth unit 507 sends a message for requesting a call switching or a message for requesting a MAC address of the second data communication equipment 107 to the second data communication equipment 107 and then receives a signal containing one of the requested IP address, domain name and MAC address from the second data communication equipment 107. Additionally, when the second communication equipment 107 acquires a phone number of the second mobile device 103 and then sends a request for a call switching to the mobile communication network 109 in the above-discussed call switching procedure, the Bluetooth unit 507 receives a message for requesting a phone number of the second mobile device 103 from the second data communication equipment 107 and then sends a signal containing the requested phone number to the second data communication equipment 107. This is the same as in the first mobile device 101.

The memory unit 509 stores applications required for operations related to an exemplary embodiment of the present invention, applications required for supporting a call service, user data produced in or required for a call service, other data required for operating any kinds of programs, and the like. The memory unit 509 may consist of a program region and a data region.

The program region may store an Operating System (OS) for booting and operating the mobile device 500, and applications required for performing various functions of the mobile device 500, such as a web browser for surfing on the Internet, an Moving Picture Experts Group (MPEG)-1 or MPEG-2 Audio Layer 3 (MP3) application for playing digital sounds, an image viewer application for showing image files, a video player application, a game application, and the like.

More particularly, the program region may store a call switching program for performing a call switching function of the mobile device 500. The call switching program may enable the mobile device 500 to acquire one of an IP address, a domain name and a MAC address required for performing a call switching function and also to create a call switching request message containing an IP address or a MAC address. Additionally, the call switching program may enable the mobile device 500 to transmit a call switching request message to the mobile communication network 109 and also to terminate a current voice or video call when receiving a message for indicating the completion of a call switching from the mobile communication network 109.

The data region stores data created or received while the mobile device 500 is used. For instance, the data region may store an MP3 file, a photo file, a video file, etc. used or created in related applications. More particularly, the data region may store an address of specific data communication equipment acquired through a call switching program by the mobile device 500. For instance, the data region of the first mobile device 101 may store one of an IP address, a domain name and a MAC address of the first data communication equipment 105, and the data region of the second mobile device 103 may store one of an IP address, a domain name and a MAC address of the second data communication equipment 107.

The input unit 511 creates an input signal for entering letters and numerals and an input signal for setting or controlling functions of the mobile device 500, and then delivers them to the control unit 501. The input unit 511 includes a plurality of input keys and function keys to create such input signals. The function keys may have navigation keys, side keys, shortcut keys, and any other special keys. The input unit 511 may be formed of one or combination of a touchpad, a touch screen, a keypad having a normal key layout, a keypad having a QWERTY key layout. More particularly, the input unit 511 may send an address of the specific data communication equipment, entered by a user, to the control unit 501. For instance, in order to perform a call switching function, the second mobile device 103 may receive one of an IP address, a domain name and a MAC address of the second data communication equipment 107 which is directly inputted from a user through the input unit 511.

The control unit 501 performs overall control functions for the mobile device 500 and also controls the flow of signals in respective elements of the mobile device 500. Namely, the control unit 501 controls the signal flow among the display unit 503, the RF unit 505, the Bluetooth unit 507, the memory unit 509, and the input unit 511.

More particularly, depending on user's manipulation, the control unit 501 may enable the Bluetooth unit 507 to transmit a message for requesting an IP address or domain name of the specific data communication equipment or a message for requesting a MAC address of the specific data communication equipment to the specific data communication equipment. Additionally, if the Bluetooth unit 507 receives a signal containing one of the requested IP address, domain name and MAC address from the specific data communication equipment, the control unit 501 may create a call switching request message containing one of the requested IP address, domain name and MAC address and then may enable the RF unit 505 to send the created message to the mobile communication network 109. If the RF unit 505 receives a message for indicating the completion of a call switching procedure from the mobile communication network 109, the control unit 501 may enable respective elements of the mobile device 500 to terminate a current voice or video call.

Meanwhile, if the Bluetooth unit 507 receives a message for requesting a phone number of the mobile device 500 from the specific data communication equipment, the control unit 501 may create a signal containing the requested phone number and then may enable the Bluetooth unit 507 to send the created signal to the message-transmitting data communication equipment. Additionally, if the RF unit 505 receives a message for checking a call-ready state of the mobile device 500 from the mobile communication network 109, the control unit 501 may check a call-ready state of the mobile device 500, create a message for indicating that the mobile device 500 is ready for a call, and then enable the RF unit 505 to send the created message to the mobile communication network 109.

Respective methods for operating the mobile device 500 and the mobile communication network 109 are described in more detail below with reference to FIGS. 6 and 7.

Figure 6:
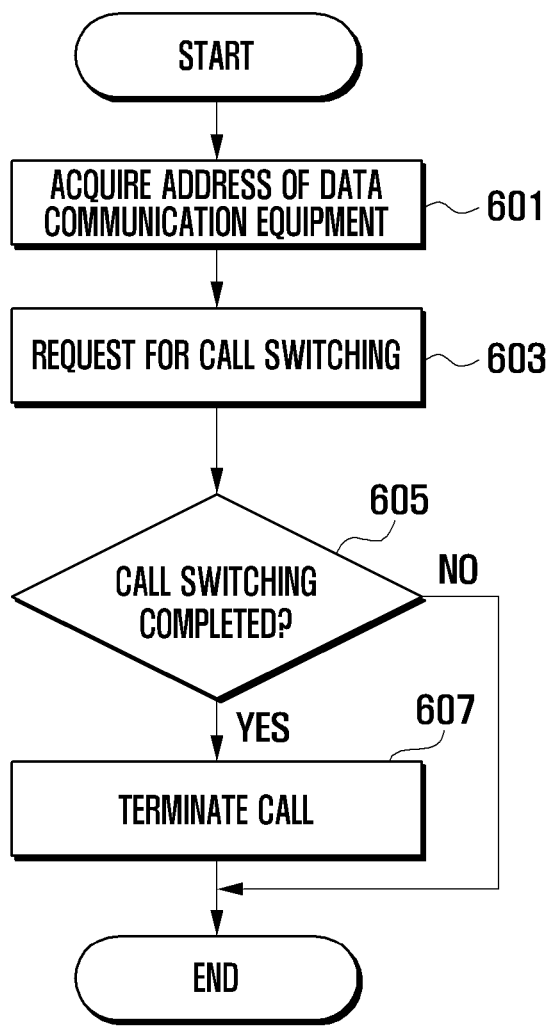
FIG. 6 is a flow diagram illustrating a method for operating a mobile device according to an exemplary embodiment of the present invention.

FIG. 6 is a flow diagram illustrating a method for operating a mobile device according to an exemplary embodiment of the present invention.

Referring to FIG. 6, at the outset, the control unit 501 of the specific mobile device 500 acquires an address of the specific data communication equipment to which a call will be transferred in step 601. Namely, depending on user's manipulation, the control unit 501 may enable the Bluetooth unit 507 to send a message for requesting an IP address or domain name to the specific data communication equipment to which a call will be transferred. If the communication network 111 is formed of Ethernet, the control unit 501 may enable the Bluetooth unit 507 to send a message for requesting a MAC address to the specific data communication equipment. Additionally, if the Bluetooth unit 507 receives a signal containing one of the requested IP address, domain name and MAC address from the specific data communication equipment, the control unit 501 may enable the memory unit 509 to store the received IP address, domain name or MAC address. If one of an IP address, domain name and MAC address is inputted directly from a user, the control unit 501 may acquire the inputted IP address, domain name or MAC address from an input signal received through the input unit 511 and then enable the memory unit 509 to store the acquired IP address, domain name or MAC address. If acquiring a domain name of the specific data communication equipment, the mobile device 500 may acquire an IP address corresponding to the acquired domain name through a DNS.

Next, the control unit 501 requests a call switching by creating a call switching request message containing the stored IP address or MAC address and then enabling the RF unit 505 to send the created message to the mobile communication network 109 in step 603. Thereafter, the control unit 501 determines whether the RF unit 505 receives a message for acknowledging the completion of a call switching procedure from the mobile communication network 109 in step 605. If receiving the acknowledgement message, the control unit 501 may proceed to step 607. However, if failing to receive the completion message, namely if receiving a call switching failure message, the control unit 501 may end a process shown in FIG. 6.

In the step 607, the control unit 501 enables respective elements of the mobile device 500 to terminate a current voice or video call.

As discussed hereinbefore, the mobile device 500 according to an exemplary embodiment of the present invention may acquire an address of specific data communication equipment to which a call will be transferred, depending on a user's manipulation. Also, the mobile device 500 may request a call switching by sending a call switching request message containing the acquired address of the specific data communication equipment to the mobile communication network 109. Then, when receiving a call switching acknowledgment message from the mobile communication network 109, the mobile device 500 may terminate a current voice or video call.

Figure 7:
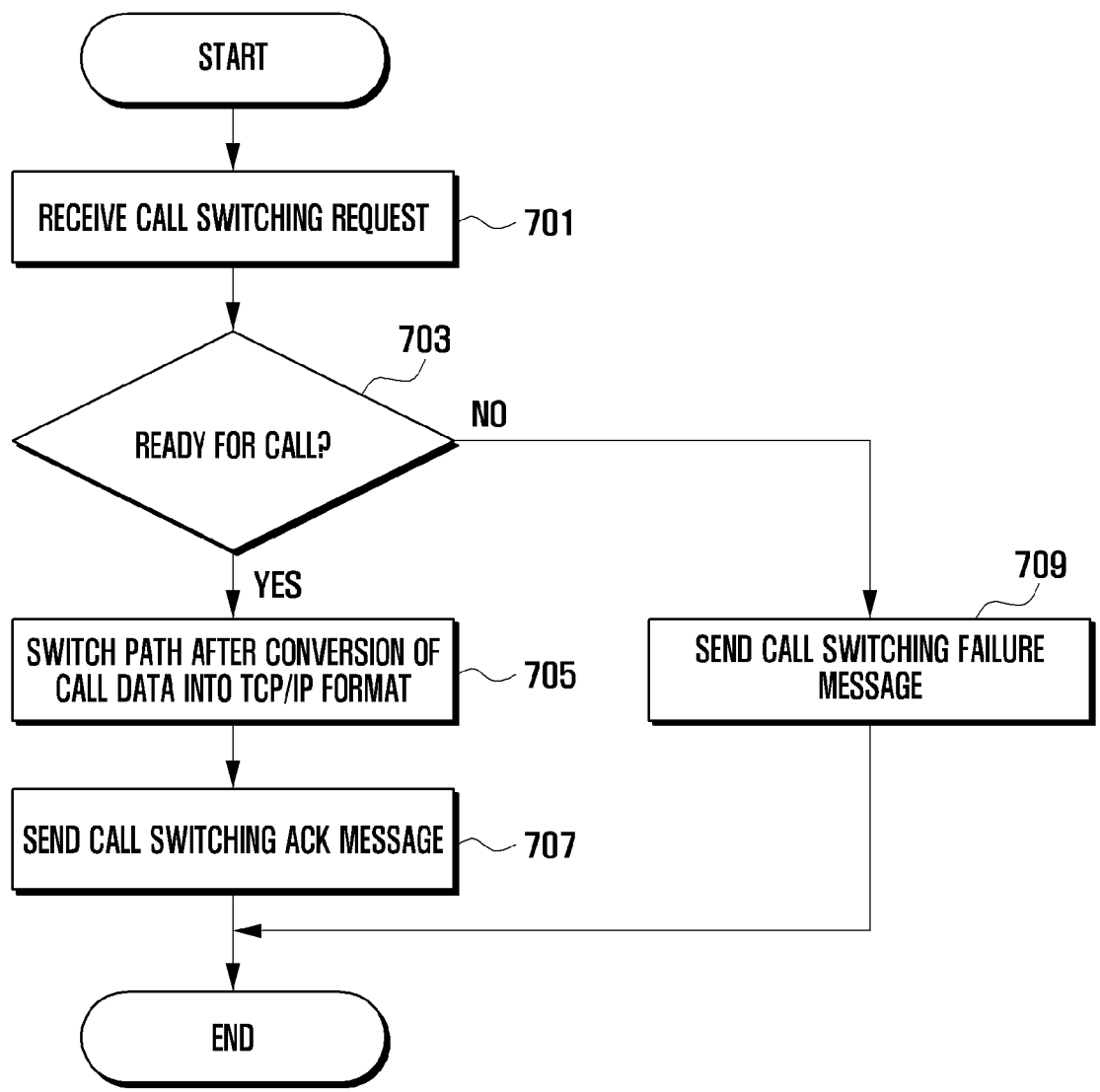
FIG. 7 is a flow diagram illustrating a method for operating a mobile communication network according to an exemplary embodiment of the present invention.

FIG. 7 is a flow diagram illustrating a method for operating a mobile communication network according to an exemplary embodiment of the present invention.

Referring to FIG. 7, at the outset, the mobile communication network 109 receives a call switching request message from the specific mobile device 500 in step 701 and therefore a call switching procedure begins.

Then, through the communication network 111, the mobile communication network 109 sends a message for checking a call-ready state to an address of the specific data communication equipment contained in the received call switching request message in step 703. If receiving a response message indicating that the specific data communication equipment is ready for a call, the mobile communication network 109 may proceed to step 705. However, if failing to receive a response message for a call-ready completion from the specific data communication equipment for a given time, the mobile communication network 109 may proceed to step 709.

The mobile communication network 109 receives call data a certain communication device transmits to the specific mobile device 500, and then sends the received call data to the specific data communication equipment through the communication network 111 in step 705. In addition, the mobile communication network 109 receives call data from the specific data communication equipment through the communication network 111, and then sends the received call data to a certain communication device in step 705. Herein, the call data is converted into a TCP/IP format and then the path for the call is switched. Therefore, the mobile communication network 109 can transfer a voice or video call, being performed by the specific mobile device 500 that sends a call switching request message, to the specific data communication equipment.

Next, the mobile communication network 109 sends a message acknowledging (ACK) the completion of a call switching procedure to the specific mobile device 500 that requests a call switching so that the specific mobile device may terminate a current voice or video call in step 707.

On the other hand, if failing to receive a message indicating a call-ready completion from the specific data communication equipment for a given time in step 703, the mobile communication network 109 sends a call switching failure message to the specific mobile device 500 in step 709.

As discussed hereinbefore, the mobile communication network 109 according to an exemplary embodiment of the present invention may receive a call switching request message from certain communication equipment that accesses the mobile communication network 109, and then may switch a voice or video call being performed by the requesting communication equipment to any other communication equipment that has an IP address or MAC address contained in the received call switching request message.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for a call switching service of a mobile device, the method comprising:
    at a first mobile device, transferring a call to specific data communication equipment, the first mobile device establishing a wireless communication channel with a mobile communication network; and
    at the mobile communication network, establishing a call channel between the specific data communication equipment to which the call is transferred and a second mobile device that is not transferring the call to the specific data communication equipment, the second mobile device establishing a wireless communication channel with the mobile communication network, wherein the transferring of the call comprises:
at the first mobile device, acquiring an address of the specific data communication equipment to which the call will be transferred; and
at the first mobile device, sending a call switching request message containing the acquired address to the mobile communication network.

2. The method of claim 1, wherein the acquiring of the address of the specific data communication equipment comprises:
at the first mobile device, acquiring at least one of an Internet Protocol (IP) address, a domain name and a Media Access Control (MAC) address of the specific data communication equipment through a short range wireless communication unit.

3. The method of claim 2, wherein the acquiring of the at least one of the IP address, the domain name and the MAC address of the specific data communication equipment through the short range wireless communication unit comprises:
acquiring at least one of the IP address, the domain name and the MAC address of the specific data communication equipment through the short range wireless communication unit, when the first mobile device is within a certain proximity of the specific data communication equipment or after the specific data communication equipment is selected among neighboring data communication equipment that is found using the short range wireless communication unit.

4. The method of claim 2, wherein the short range wireless communication unit comprises one of Bluetooth communication unit, a Zigbee communication unit, a Near Field Communication (NFC) unit, and an infrared communication unit.

5. The method of claim 1, wherein the acquiring of the address of the specific data communication equipment comprises:
at the first mobile device, receiving at least one of an Internet Protocol (IP) address, a domain name and a Media Access Control (MAC) address of the specific data communication equipment through an input unit.

6. The method of claim 1, wherein the transferring of the call further comprises:
at the specific data communication equipment to which the call will be transferred, acquiring a phone number of the first mobile device.

7. The method of claim 1, wherein the transferring of the call further comprises:
at the mobile communication network, switching a call path between the first and second mobile devices to a new call path between the specific data communication equipment and the second mobile device, or between the specific data communication equipment and another data communication equipment to which the second mobile device transfers the call.

8. The method of claim 7, wherein the call path between the first and second mobile devices comprises one of:
a first call path from the first mobile device to the specific data communication equipment, passing through a first base station, a first Mobile Switching Center (MSC) and a communication network, the first base station being connected to the first mobile device, the first MSC being connected to the first base station, and the communication network being connected between the first MSC and the specific data communication equipment; and
a second call path from the first mobile device to the specific data communication equipment, passing through the first base station, the first MSC, a Public Switched Telephone Network (PSTN), a second MSC and the communication network, the PSTN being connected to the first MSC, the second MSC being connected to the PSTN, and the communication network being connected between the second MSC and the specific data communication equipment.

9. The method of claim 1, further comprising:
after the transferring of the call,
at the mobile communication network, checking a call-ready state of the specific data communication equipment;
at the mobile communication network, transmitting a message indicating a complete call switching to the first mobile device; and
at the first mobile device, receiving the message from the mobile communication network and then terminating a current voice or video call.

10. The method of claim 1, wherein the transferring of the call comprises:
at the first and second mobile devices, transferring the call to different data communication equipments, respectively.

11. The method of claim 10, further comprising:
establishing a call channel between the specific data communication equipment to which the first mobile device transfers the call and another data communication equipment to which the second mobile device transfers the call.

12. The method of claim 11, wherein the call channel is established through a communication network without passing through the mobile communication network.

13. A system for a call switching service of a mobile device, the system comprising:
first and second mobile devices each for performing a voice or video call function through a mobile communication network and each including short range wireless communication unit;
first and second data communication equipments each for performing a voice or video call function through a communication network and each including a short range wireless communication unit;
the mobile communication network for establishing a wireless communication channel with each of the first and second mobile devices in order to support a voice or video call and, when receiving a request for a call switching to at least one of the first and second data communication equipments from at least one of the first and second mobile devices, for performing a call switching procedure; and
the communication network connected to the first and second data communication equipments and the mobile communication network for supporting a data communication based on a data packet exchange,
wherein the mobile communication network includes:
a first base station for establishing a wireless communication channel with the first mobile device and for supporting a call data exchange between the first mobile device and a first Mobile Switching Center (MSC),
a second base station for establishing a wireless communication channel with the second mobile device and for supporting a call data exchange between the second mobile device and a second MSC, the first MSC connected to the first base station for controlling the voice or video call and additional services of the first mobile device, for establishing a call path of the first mobile device, and for offering a connection between the first mobile device and any other equipment or external network, and the second MSC connected to the second base station for controlling the voice or video call and additional services of the second mobile device, for establishing a call path of the second mobile device, and for offering a connection between the second mobile device and any other equipment or external network.

14. The system of claim 13, wherein the mobile communication network includes a Public Switched Telephone Network (PSTN) configured to connect the first and second MSCs and to support data exchanges between the first and second MSCs.

15. The system of claim 13, wherein the short range wireless communication unit comprises one of Bluetooth communication unit, a Zigbee communication unit, a Near Field Communication (NFC) unit, and an infrared communication unit.

16. A mobile device, the device comprising:
a Radio Frequency (RF) unit for establishing a wireless communication channel with a mobile communication network and for transmitting and receiving data through the wireless communication channel including;
a short range wireless communication unit for establishing a short range wireless communication channel with neighboring data communication equipment and for transmitting and receiving data through the short range wireless communication channel including; and
a control unit for controlling the RF unit to transmit and receive call data for a voice or video call, for controlling signals for a call switching service including, and for controlling the short range wireless communication unit to acquire at least one of an Internet Protocol (IP) address, a domain name and a Media Access Control (MAC) address of data communication equipment to or from which a call is transferred,
wherein the controlling of the signals for a call switching service includes sending a call switching request message containing the acquired at least one of an Internet Protocol (IP) address, domain name and a Media Access Control (MAC) to the mobile communication network.

17. The device of claim 16, further comprising:
an input unit for receiving at least one of the IP address, the domain name and the MAC address directly from a user,
wherein the control unit receives at least one of the IP address, the domain name and the MAC address from the input unit.

18. The device of claim 16, wherein the short range wireless communication unit comprises one of Bluetooth communication unit, a Zigbee communication unit, a Near Field Communication (NFC) unit, and an infrared communication unit.

* * * * *